United States Patent Office 2,881,112
Patented Apr. 7, 1959

2,881,112

HORMONE COMPOSITION FOR IMPROVING MEAT PRODUCTION EFFICIENCY AND METHOD FOR USING SAME

William Earl Mattox and Frank C. Moore, Indianapolis, Ind., assignors to Mattox and Moore, Inc., Indianapolis, Ind., a corporation of Indiana No Drawing. Application January 14, 1954
Serial No. 404,133

7 Claims. (Cl. 167—53.1)

This invention relates to the improvement of meat production efficiency in meat producing animals such as fowl, beef and sheep.

The meat producer, growing meat producing animals for sale as meat, is concerned with a number of factors. He is concerned with quantity, that is, with the dressed weight of meat produced by the animals. He is concerned with quality, that is, that the meat produced is of high grade and will command a premium price on the market, which involves the appearance of the dressed meat, its tenderness, and its palatability. He is also concerned with production efficiency, that is, with producing good quantities of high quality meat in a minimum of time, with a minimum of labor, and at low cost. This involves the factor of feed conversion or feed utilization, that is, the rate of meat gain per unit of feed consumed. It also involves the factor of obtaining the desired "finish" on the animal, which depends on the final stages of feeding and handling, and largely determines the quality rating of the meat produced. A properly finished animal attains what is referred to as a certain "bloom," and its meat has an appearance which in beef is referred to as marbling and which results from the deposition of fat between the fibers of the meat. When chemical compositions are used to stimulate or expedite the desired meat production, it is of course essential that the compositions used be non-toxic to the animal and do not impede the desired development of the animal and thus do not by their side effects destroy the desired result. Such compositions must also produce no deleterious change in the meat of the animal and must neither leave nor produce a residue in the meat which may be toxic or harmful to consumers of the meat.

It is the primary object of this invention to improve the meat producing process and the resulting meat product, and thus to provide individual and combined improvements in the several factors referred to above.

It is known that certain improvements in certain of these factors may be obtained by administering to the animal at a calculated time prior to its butchering a quantity of an estrogen, such as diethylstilbestrol, or other lipogenic agent. For example, diethylstilbestrol has commonly been administered to chickens and other fowl approximately three to five weeks prior to their marketing. This has been done by implanting a pellet containing the diethylstilbestrol subcutaneously high up on the neck of the chicken. It has also been done by the forced extrusion injection at substantially that same site of a plastic semi-solid material containing the diethylstilbestrol, in accordance with a process and using a product invented by us, as disclosed in our co-pending application Serial No. 193,195, filed October 31, 1950, now Patent No. 2,681,297.

We have now discovered that meat production is improved by injection administration of a thyroid-depressing agent; and that especially improved results are obtained by administering to the animal at a suitable time in advance of its butchering both (a) a lipogenic agent and (b) a thyroid-depressing agent, preferably by administering these two agents together in a composition in combination with (c) a suitable vehicle, especially by administering such a composition beneath the skin, by the forced-extrusion injection procedure and with a plastic semi-solid extrudable composition of the physical character disclosed in our aforesaid co-pending application.

The lipogenic agent used may be any of a number of chemical compounds, natural or synthetic, or combinations of such compounds, which have a lipogenic function. These include especially the various estrogenic materials, both natural and synthetic, of which a number are known. Of such estrogenic materials, we prefer to use diethylstilbestrol, for much information is known with respect to its physiological action, its effectiveness for the purpose, and its low toxicity, and it is relatively low in cost and readily available in pure crystalline form. Preferably, the lipogenic agent used should be relatively water-insoluble, which is a characteristic of diethylstilbestrol, so that it may be administered through the skin, for example, subcutaneously or intramuscularly, and will form a deposit in solid or crystalline state from which it will be slowly absorbed and utilized by the animal to produce a long-acting effect.

The thyroid-depressing agent used may be any of a number of chemical compounds which have a thyroid-depressing effect or which reduce the amount of thyroxin present in the animal system during the period of its effect. Such thyroid-depressing agents include, for example, thiouracil and its various anti-thyroid derivatives such as propylthiouracil, the various anti-thyroid thiocyanate compounds, and the anti-thyroid imidazole compounds. Of these, we prefer to use 1-methyl-2-mercaptoimidazole, commonly known as methimazole and available on the market as "tapazole," because of its high degree of effectiveness, the small dosage required, its high margin of safety from the point of view of toxicity, and its relatively low cost and ready availability.

The lipogenic agent and thyroid-depressing agent are preferably administered together in a composition containing both agents in a co-operating vehicle. The vehicle is desirably one which forms a composition adapted to be administered through the skin of the animal to carry the agents into the animal, and preferably one which will cause the formation of a deposit from which one or both of the active agents will be absorbed slowly to produce a long-acting effect throughout the desired period prior to butchering.

Solid compositions might be used, but these would require a pellet implantation procedure, which is difficult and slow, and variable in its results. Liquid injectable compositions might be used, but these involve difficulties of maintaining a relatively water-soluble agent such as diethylstilbestrol in uniform distribution, and difficulties of administering a liquid containing suspended solids.

Most desirably, we prefer a composition in plastic semi-solid state which is administrable by forced extrusion injection, as set forth in our aforesaid co-pending application.

The preferred composition is one containing the lipogenic and thyroid-depressing agents in uniform distribution (suspended or dissolved) in a water-soluble vehicle. In physical state at the body temperature of the animal and at lower temperatures, the composition is desirably semi-solid and non-flowing, but with sufficient plasticity to be extrudable under elevated pressures through a hypodermic needle of reasonable size, for example, extrudable at a pressure of 200 to 500 pounds per square inch through a No. 16 hypodermic needle. The stiff physical state of the composition will maintain the uniform distribution of the active agents, and will facilitate economical and speedy administration. It is preferably administered by the extrusion-injection gun of our Patent No. 2,624,338.

For the vehicle in the preferred plastic semi-solid composition, we desirably use a so-called water-soluble wax of high molecular weight and normally a relatively stiff solid, in combination with a plasticizer. The water-soluble wax of our composition is desirably one or a mixture of polyethylene glycols having an average molecular weight of the order of 4000 or higher, which is definitely solid at high atmospheric temperatures, and solid at the high body temperatures of the animals, for example, the chicken body temperature of 107° F. The plasticizer used may be any of a number of liquids which are miscible with the polyethylene glycol and are known to have plasticizing effects in combination with it. Suitable plasticizers include polyhydric alcohols, such as glycerin, propylene glycol, and preferably polyethylene glycols of low molecular weight and of normal liquid state, such as the polyethylene glycols having an average molecular weight of the order of 200 to 300.

A vehicle including a polyethylene glycol wax and a plasticizer desirably contains from 30% to 70% (by weight) of a polyethylene glycol wax having an average molecular weight of 4000 or higher, and from 70% to 30% of the plasticizer such as polyethylene glycol liquid having an average molecular weight of 200, and most desirably contains from 40% to 60% of the polyethylene glycol and from 60% to 40% of the plasticizer.

A composition in accordance with our invention may be prepared by mixing the active agents and the vehicle in any suitable way. Preferably, in making a plastic semi-solid composition, the vehicle may be melted, as at a temperature of about 85° F., the water insoluble estrogen and the thyroid-depressing agent are added to the hot mixture, and the resulting mixture is stirred to thoroughly distribute the active agents throughout the mixture. The hot mixture is then brought to room temperature, at which it takes on the desired physical state of a plastic semi-solid paste-like mass. The semi-solid consistency of the composition will retain a high concentration of the active ingredients and maintain the uniform distribution thereof throughout the composition during storage, distribution, and use. The desired dosage may therefore be contained in a relatively small quantity of the composition.

The amounts and relative proportions of the lipogenic agent and the thyroid-depressing agent may vary, depending upon their relative activity per unit quantity. In prior administrations of diethylstilbestrol alone to fowl and cattle for meat growth promoting effects, we have found it desirable to use a plastic semi-solid composition containing the diethylstilbestrol in a concentration of about 60 to 75 mg. of diethylstilbestrol per cc. of total composition so that 15 mg. of diethylstilbestrol is administered by an injection of 0.2 to 0.25 cc. of total composition, and this is the normal dose in chickens. In the present composition, we may use that same proportion of diethylstilbestrol, or its equivalent of other lipogenic agent, per cc. of the composition. In combination with the thyroid-depressing agent, however, we may use a somewhat lower dosage of lipogenic agent. Thus, in chickens, we desirably use from 5 mg. to 15 mg., and preferably about 10 mg. of diethylstilbestrol per dose. In cattle, we may use the same concentration, and increase the quantity of composition administered per dose.

The amount of thyroid-depressing agent used depends upon the physiological effect desired both per se and in relationship to the effect of the lipogenic agent used. Using tapazole in combination with diethylstilbestrol as an example, we preferably use about 2 mg. to about 7 mg. of tapazole in a composition containing from 5 mg. to 15 mg. of diethylstilbestrol, and most preferably, we use a composition containing about 3 mg. of tapazole and about 10 mg. of diethylstilbestrol per chicken dose.

Other thyroid-depressing agents and other lipogenic agents may be used in amounts effectively corresponding to the amounts set forth above for tapazole and diethylstilbestrol. For example, propylthiouracil is substantially less active per mg. than tapazole, and hence it requires about 25 mg. of propylthiouracil to produce the equivalent effect of 3 mg. of tapazole, and we have used compositions containing 25 mg. of propylthiouracil and 15 mg. of diethylstilbestrol per injection dose in chickens.

We have found that the use of the composition containing a lipogenic agent and a thyroid-depressing agent in combination gives substantially improved results in meat production. While we are not sure of the mechanism by which this improvement is obtained, we believe that the thyroid-depressing agent lowers the metabolic rate of the physiological processes of the animal, and both tend to cause a greater production of fibrous meat tissue, and facilitates the fat production and disposition which results from the presence of lipogenic agent. There is thus a pronounced co-operative or synergistic action between the two agents, and the results with a combination of the two agents substantially surpass the results obtained with either agent alone, and indeed substantially surpass the results which might be expected from the separate actions of the two agents.

The following examples illustrate the invention and indicate the improved results obtained by administration of the injectable composition prepared in accordance with our invention.

EXAMPLE 1

Four compositions were prepared, using the same vehicle in each case and using different quantities and proportions of tapazole and diethylstilbestrol.

In each case, the vehicle consisted of a semi-solid plastic mixture of 40 parts of polymerized polyethylene glycols having an average molecular-weight of 4000 and obtained commercially on the market as "Carbowax 4000" and 60 parts of polymerized polyethylene glycols having an average molecular-weight of 200, as a plasticizer. Each composition was prepared by melting the vehicle at a temperature of about 85° F., and thoroughly mixing with the hot liquid vehicle an appropriate proportion of tapazole and diethylstilbestrol to give the desired concentration. The hot mixture was then brought to room temperature and filled into rubber-stoppered ampoules, so that the composition was suitable for administration by extrusion injection with a dispensing gun as shown in our Patent No. 2,624,338. The four compositions were administered to four groups of chickens, and a fifth group of chickens was maintained as a control. The compositions used were as follows:

Composition A contained 3 mg. of tapazole and 15 mg. of diethylstilbestrol in each 0.226 cc. dose of total composition.
Composition B contained 5 mg. of tapazole and 15 mg. of diethylstilbestrol in each 0.226 cc. dose of total composition.
Composition C contained no tapazole and 15 mg. of diethylstilbestrol in each 0.226 cc. dose of total composition, and thus corresponded to a commercial product which has been extensively used and sold under an active application to the Federal Food and Drug Administration.
Composition D contained 3 mg. of tapazole and no diethylstilbestrol in each 0.226 cc. dose of total composition.

Each of the five groups of chickens contained thirty (30) chickens about seven and one-half (7½) weeks old. The four compositions were respectively administered to four of the groups by extrusion injection of an 0.226 cc. dose of composition subcutaneously in each chicken at a point on top of the neck where the neck joins the head. All groups were kept under corresponding conditions and fed the same ration throughout the test. The chickens were killed four weeks after the administration of the compositions, and were dressed for market.

The results of the test were as follows:

Table I

| Group | 1 | 2 | 3 | 4 | 5 |
|---|---|---|---|---|---|
| Composition | A | B | C | D | (Control) |
| Amount Tapazole mg. | 3 | 5 | | 3 | |
| Amount Diethylstilbestrol mg. | 15 | 15 | 15 | | |
| Avg. beginning live wt. (lbs.) | 1.88 | 1.80 | 1.92 | 1.85 | 2.00 |
| Avg. finish live wt. (lbs.) | 3.98 | 3.75 | 4.02 | 3.75 | 3.77 |
| Avg. wt. gain (lbs.) | 2.10 | 1.95 | 2.10 | 1.90 | 1.77 |
| Avg. percent wt. gain | 112 | 108 | 109 | 103 | 88 |
| Avg. feed consumed per bird | 6.00 | 6.49 | 7.14 | 5.78 | 6.38 |
| Feed conversion, lbs. feed per lb. gain | 2.86 | 3.33 | 3.40 | 3.04 | 3.60 |
| Avg. dressed wt. (lb.) | 2.62 | 2.51 | 2.70 | 2.41 | 2.58 |
| Percent dressed wt./starting wt. | 139 | 139 | 140 | 127 | 129 |

Whereas the controls gained only 88% with a feed-conversion ratio of 3.60 pounds of feed per pound of gain, tapazole alone increased the gain to 103% and reduced the feed-conversion ratio to 3.04. Diethylstilbestrol alone increased the gain to 109% but required a feed-conversion ratio of 3.40.

Composition B gave a high weight gain, required a reduced feed-conversion ratio, and gave a high dressed weight percentage.

Composition A increased the weight gain to 112%, reduced the feed conversion ratio to 2.86, and gave a high dressed weight percentage.

The chickens treated with Compositions A and B were best in quality. Those treated with Composition A were all of Grade A quality, whereas the controls were all of lower quality. Those treated with Composition C, which made a high weight gain on a high feed-conversion ratio, were excessively fat and averaged lower than Grade A for that reason.

EXAMPLE 2

A composition containing 2 mg. of tapazole and 10 mg. of diethylstilbestrol per dose, prepared as in Example 1, was administered to a group of 371 Beltville turkeys, and a comparable group of 373 turkeys were kept under the same conditions as a control group. The turkeys were about six weeks old when the test started, and were dressed and marketed four weeks later. Feed and weight data was kept by the producer, and the dressed turkeys were graded by the purchasing produce company.

The results were as follows:

Table II

| Group | Treated | Control |
|---|---|---|
| Avg. beginning wt. (lb.) | 7,536 | 7,686 |
| Avg. finish wt. (lb.) | 10,263 | 9,884 |
| Avg. gain (lb.) | 2,727 | 2,198 |
| Avg. gain (percent) | 36 | 28 |
| Dressing yield, percent dressed wt./finish wt. | 76.81 | 73.07 |
| Grade yield: | | |
| Grade A (percent) | 94.5 | 90.4 |
| Grade B (percent) | 5.5 | 8.3 |
| Grade C (percent) | | 1.3 |

The treated birds required 0.4 pound less feed per pound of weight gain than did the control birds. The treated turkeys thus had a higher weight gain (36% vs. 28%), required less feed per pound of gain, lost less in dressing, and were of higher quality than the control group. Because of the difference in dressing yield and grade yield, the producer received a higher price for the treated turkeys, equivalent to 3¢ per pound of finished live weight.

EXAMPLE 3

In beef cattle and sheep, administration of compositions, such as Composition D of Example 1 containing tapazole alone, and Composition A of Example 1 containing tapazole and diethylstilbestrol in the ratio of 3 mg. tapazole to 15 mg. of diethylstilbestrol, produce like results. In such animals, the administration is conveniently made by extrusion injection subcutaneously in the fleshy part of the ear. Conveniently, the compositions used are the same as set forth in Example 1 but larger amounts are used. Thus, in lambs, the amount of such compositions administered can be about 0.45 cc., and in beef can be about 0.45 cc. to 0.68 cc., and such dosages can be administered with the standard extrusion-injection gun of our Patent No. 2,624,338, by actuating it two or three times for each injection. Administration of Composition A of Example 1 is especially advantageous. In beef, for example, it not only increases the weight gain and lowers the feed-conversion ratio, but increases the desired "marbling" of the meat, in which fat is deposited throughout the fibers of the meat.

While we do not fully understand the mechanism by which the agents used are effective, our experience indicates that the estrogenic material causes an increased production of fat. With an estrogen alone, the fat is in part distributed in the meat, and in part tends to occur in fatty layers beneath the skin, especially in the lower parts of the animal body. Our experience indicates that the thyroid-depressing agent exerts a controlling effect, which reduces the amount of feed consumed and both causes an increase in meat tissue production and causes the fat produced to be more firm and to be deposited in greater proportion throughout the tissue and less as fatty deposits beneath the skin.

We claim as our invention:

1. A composition for administration to meat-producing animals to promote meat production thereby, comprising a relatively water-soluble estrogen and 1-methyl-2-mercaptoimidazole in a non-toxic injectable carrier which upon injection deposits the estrogen in solid state for absorption over a prolonged period and from which the 1-methyl-2-mercaptoimidazole is promptly absorbed by body fluids.

2. A composition for administration to meat-producing animals to promote meat production thereby, comprising a plastic, semi-solid mixture containing a relatively water-insoluble estrogen and 1-methyl-2-mercaptoimidazole uniformly distributed in a water-soluble vehicle comprising normally solid polyethylene glycols having an average molecular weight of at least 4000 and a polyhydric alcohol plasticizer.

3. A composition for administration to meat-producing animals to promote meat production thereby, comprising a plastic semi-solid mixture containing 1-methyl-2-mercaptoimidazole and a relatively water-insoluble estrogen uniformly distributed in a water-soluble vehicle comprising a mixture of polyethylene glycols having an average molecular weight of at least about 4000 and polyethylene glycols having an average molecular weight of from about 200 to about 300.

4. A composition for injection administration to meat-producing animals to promote meat-production thereby, comprising 1-methyl-2-mercaptoimidazole and diethylstilbestrol in a non-toxic water-soluble injectable vehicle.

5. A composition for injection administration to meat-producing animals to promote meat-production thereby, comprising 1-methyl-2-mercaptoimidazole and diethylstilbestrol in a non-toxic water-soluble injectable vehicle, with the 1-methyl-2-mercaptoimidazole present in smaller amount than the diethylstilbestrol.

6. The method of promoting meat production in meat-producing animals, which comprises administering beneath the skin of the animal a deposit of diethylstilbestrol to be absorbed over a prolonged period of treatment, and administering at the beginning of such period an injection of 1-methyl-2-mercaptoimidazole.

7. The method of improving the promotion of meat-production obtained by treating meat-producing animals over a prolonged period with diethylstilbestrol, which comprises administering to the animals at the beginning of the treatment period an injection of 1-methyl-2-mercaptoimidazole, said injection when the animals are fowl comprising about 2 mg. to about 7 mg. of 1-methyl-2-mercaptoimidazole.

References Cited in the file of this patent

UNITED STATES PATENTS 2,681,297    Moore et al.  ---------- June 15, 1954

FOREIGN PATENTS 636,908    Great Britain  ---------- May 10, 1950

OTHER REFERENCES

Hormonal Relationships and Applications in the Production of Meats, Milk and Eggs, publ. 266, Nat. Res. Council, March 1953, pp. 25–27 (99–2H).

Stadelman: Poultry Sci., vol. 30, No. 6, November 1951, p. 931.

Robblee: Poultry Sci., vol. 30, No. 5, pp. 772–774.

Drug and Cos. Ind., vol. 70, No. 4, April 1952, p. 527.

UNITED STATES PATENT OFFICE
CERTIFICATE OF CORRECTION

Patent No. 2,881,112                                            April 7, 1959

William Earl Mattox et al.

It is hereby certified that error appears in the printed specification of the above numbered patent requiring correction and that the said Letters Patent should read as corrected below.

Column 2, line 35, for 'on the market as "tapazole,"' read -- on the market under the registered trademark "TAPAZOLE"; in all other occurrences of the word, for "tapazole", including column 3, lines 69, 71, 73, and column 4, lines 2, 4, 6, 32, 42, 52, 55, 58, 64, and column 5, lines 20, 39, 74, 75, and column 6, line 1, read -- methimazole --; column 5, line 9, Table I, second data line, for "Tapazole" read -- methimazole --; column 6, line 33, for "water-soluble" read -- water-insoluble --.

Signed and sealed this 4th day of August 1959.

(SEAL)

Attest:

KARL H. AXLINE

Attesting Officer

ROBERT C. WATSON
Commissioner of Patents